United States Patent [19]

Bando et al.

[11] Patent Number: 4,952,852
[45] Date of Patent: Aug. 28, 1990

[54] POWER SYSTEM AND SYNCHRONIZING BREAKERS FOR A VARIABLE SPEED GENERATOR MOTOR SYSTEM

[75] Inventors: Akira Bando, Hitachi; Osamu Nagura, Katsuta; Keiji Saito; Ikuro Miyashita, both of Hitachi; Hashime Nagai, Kitaibaraki; Hiroto Nakagawa, Osaka; Yasuteru Oono, Kobe, all of Japan

[73] Assignees: Hitachi, Ltd., Tokyo; The Kansai Electric Power Co., Inc., Osaka, both of Japan

[21] Appl. No.: 229,995

[22] Filed: Aug. 9, 1988

[30] Foreign Application Priority Data

Aug. 14, 1987 [JP] Japan ............................ 62-201709

[51] Int. Cl.⁵ ............................................ H02H 7/08
[52] U.S. Cl. .................................. 318/140; 318/434; 361/31
[58] Field of Search .............. 318/447, 452, 50, 51, 318/79, 112, 140, 141, 147, 151, 434; 361/23, 24, 28, 30, 31, 62, 63, 42, 50, 26, 21

[56] References Cited

U.S. PATENT DOCUMENTS

| | | | |
|---|---|---|---|
| 2,735,976 | 2/1956 | Danly | 361/31 X |
| 3,581,179 | 5/1971 | Jones | 361/31 X |
| 3,660,721 | 5/1972 | Baird | 361/62 X |
| 3,873,887 | 3/1975 | Barkan et al. | 361/63 X |
| 4,021,700 | 5/1977 | Ellis-Anwyl | 361/31 X |
| 4,306,265 | 12/1981 | Kuntner et al. | 361/31 |
| 4,631,622 | 12/1986 | Howell | 361/62 X |
| 4,682,263 | 7/1987 | Gradnitzer et al. | 361/31 |

FOREIGN PATENT DOCUMENTS 1181044 9/1985 U.S.S.R. ............................ 361/28

Primary Examiner—William M. Shoop, Jr.
Assistant Examiner—A. Jonathan Wysocki
Attorney, Agent, or Firm—Fay, Sharpe, Beall, Fagan, Minnich & McKee

[57] ABSTRACT

A generator-motor apparatus with economical protection measures for use in a variable speed pumping-up electric power plant, having a main transformer, a secondary winding of which is coupled to an electric power system, a power system breaker connected to a primary winding of the main transformer, a syncronizing breaker connected in series with the power system breaker, a generator-motor, a rotor of which is mechanically coupled to the pump-turbine and an armature winding of which is connected to the power system through the synchronizing breaker, the power system breaker and the main transformer, and an excitation circuit, including a frequency converter for supplying a field winding of the generator-motor with AC voltage of the variable frequency and a converter transformer for feeding the converter, which is branched from a junction of the power system breaker and the synchronizing breaker.

6 Claims, 5 Drawing Sheets

POWER SYSTEM AND SYNCHRONIZING BREAKERS FOR A VARIABLE SPEED GENERATOR MOTOR SYSTEM

BACKGROUND OF THE INVENTION

1. Field of the Invention

The present invention relates to a variable speed generator-motor apparatus, and more particularly to a variable speed generator-motor apparatus provided with economical protection measures against grounding or short-circuiting fault occurring therein.

2. Description of the Related Art

A generator-motor apparatus of the alternating current (AC) excitation type, which is often used in a variable speed pumping-up electric power plant, comprises a generator-motor having an armature winding and a field winding provided on a stator and a rotor thereof, respectively, a main transformer connected to an electric power system, a synchronizing breaker provided between the main transformer and the armature winding of the generator-motor, a frequency converter, such as a cycloconverter, producing AC voltage of a low frequency for excitation of the field winding, a converter transformer for feeding the frequency converter, and an excitation breaker provided between the converter transformer and a junction of the main transformer and the synchronizing breaker.

Incidentally, in the following description, when only a generator-motor is referred to, distinguished from the whole of a generator-motor apparatus, it will be called an electric rotating machine or simply a rotating machine.

The rotor of the electric rotating machine is mechanically coupled to a water pump-turbine capable of operating selectively as a prime mover or a load. When driven by the pump-turbine, which operates as a water turbine, the rotating machine functions as a generator and supplies electric power to the power system through a main circuit of the generator-motor apparatus composed of the main transformer and, the synchronizing breaker. On the other hand, when the rotating machine is supplied by the power system with electric power, it operates as a motor and drives the pump-turbine so that it functions as a water pump.

In the generator-motor apparatus as mentioned above, by exciting the field winding with an AC voltage of the frequency depending on the difference between a synchronous speed determined by the frequency of the power system and a rotational speed of the rotor, the frequency of an output voltage of the electric rotating machine functioning as a generator can be maintained constant at the frequency of the power system free from fluctuation in a rotational speed of the pump-turbine functioning as a water turbine.

Similarly, in the case where the rotating machine operates as a motor, a rotational speed of the pump-turbine operating as a pump can be arbitrarily controlled irrespective of the fixed frequency of voltage applied to the rotating machine from the power system. As a result, the pump-turbine can be most efficiently operated at the adaptive speed both in the motor operation and in the generator operation.

A generator-motor apparatus applied to a variable speed pumping-up electric power plant, is disclosed in copending U.S. patent application Ser. No. 044,404 (filed on Apr. 30, 1987), now U.S. Pat. No. 4,816,696 entitled "Variable-speed Pumped-storage Power Generating System".

According thereto, a main circuit of a generator-motor apparatus includes a main transformer and a synchronizing breaker connected in series thereto. Further, the main circuit is formed between an armature winding of an electric rotating machine and an electric power system and communicates electric power therebetween.

An excitation circuit for a field winding of the rotating machine includes a cycloconverter and a converter transformer. The cycloconverter is fed by the converter transformer and supplies the field winding with AC voltage of the variable frequency. The converter transformer is connected to a junction of the main transformer and the synchronizing breaker through an excitation breaker. As will be apparent from the description above, therefore, the synchronizing breaker and the excitation breaker are provided in parallel with each other with respect to the power system.

With the disposition of the excitation breaker as mentioned above, the following problem is developed. Namely, an excitation breaker is required to have a current breaking capacity greater than that of a synchronizing breaker. For example, the synchronizing breaker is required to cut off a fault current incoming to a rotating machine from a power system, if grounding or short-circuiting fault occurs on the side of the rotating machine with respect to the breaker, and cut off a fault current flowing toward the power system from the rotating machine, if such a fault occurs on the side of a main transformer or the power system with respect to the breaker.

On the other hand, the excitation breaker must cut off a composite fault current from both sides of the power system and the rotating machine, in the case of occurrence of the grounding or short-circuiting fault in the excitation circuit. Therefore, the current to be cut off by the excitation breaker becomes substantially double the current to be cut off by the synchronizing breaker. Accordingly, as the excitation breaker, there is required an expensive breaker with a large current breaking capacity, with the result that the protection measures for a generator-motor apparatus becomes expensive as a whole.

SUMMARY OF THE INVENTION

It is an object of the present invention to provide a generator-motor apparatus with economical protection measure that are capable of reliably cutting off a fault current by a breaker which has a current breaking capacity well-matched with the capacity of the generator-motor apparatus and therefore is reasonable in cost.

There is a feature of the present invention in a variable speed generator-motor apparatus having a generator-motor with an armature winding and a field winding, a rotor of which is mechanically coupled to a prime mover-load, a main transformer provided between one of the windings of the generator-motor and an electric power system, a synchronizing breaker for connecting the one winding with the electric power system through the main transformer, and an excitation circuit including a frequency converter for exciting the other winding of the generator-motor and a converter transformer connected to the frequency converter, wherein there is further provided a power system breaker, which is connected in series with the main transformer, between the electric power system and the synchronizing breaker, and the converter transformer of the excitation circuit is connected to a junction between the synchronizing breaker and a series connection of the main transformer and power system breaker.

With the disposition of breakers as described above, even if grounding or short-circuiting fault occurs in an excitation circuit, the power system breaker and the synchronizing breaker are sufficient to cut off only a current flowing into a fault point within the excitation circuit from the power system and a current flowing thereinto from the generator-motor, respectively. Therefore, both the breakers are not necessary to have an unnecessarily large current breaking capacity.

DESCRIPTION OF THE PREFERRED EMBODIMENTS

Figure 1:
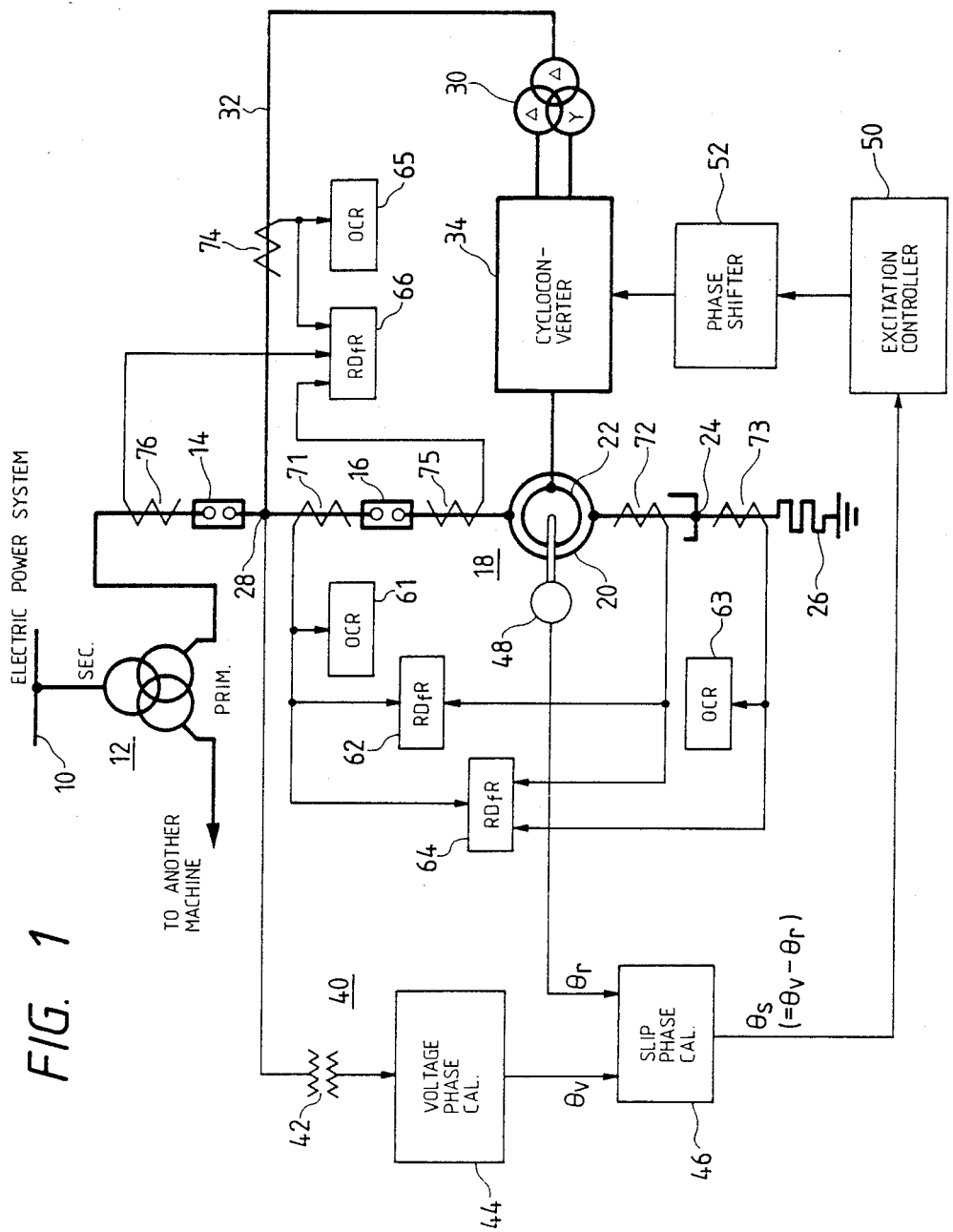
FIG. 1 is a diagram schematically showing the arrangement of a generator-motor apparatus according to an embodiment of the present invention.

In the following, an embodiment of the present invention will be explained with reference to accompanying drawings, in which FIG. 1 shows a schematic diagram of an arrangement of a generator-motor apparatus according to the embodiment, which is applied to a variable speed pumping-up electric power plant.

In the FIG. 1 reference numeral 10 denotes a line of an electric power system and reference numeral 12 denotes a main transformer, which is connected to the power system line 10. Incidentally, in the following description, a winding of the transformer 12 on the side of a generator-motor is a primary winding and a winding thereof on the side of the power system is a secondary winding. As shown in the figure, the main transformer 12, which is coupled to the power system line 10 through its secondary winding, has plural primary windings (two windings in the example shown). Each primary winding thereof can be connected to a circuit as described below, which includes a particular generator-motor.

Figure 1A:
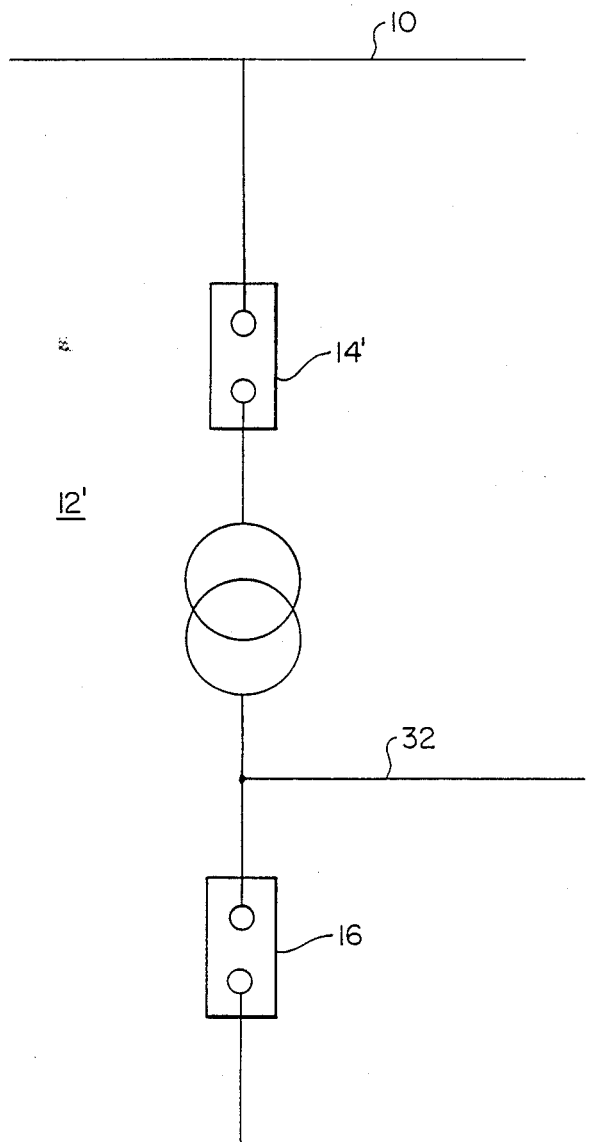
FIG. 1A is a partial schematic diagram of an alternative arrangement of the power system and synchronizing breakers shown in FIG. 1.

A first breaker 14 is connected to one of the primary windings of the main transformer 12. Although in FIG. 1 the first breaker 14 is connected to the primary winding of the main transformer 12, it can be provided on the secondary side thereof, i.e., between the main transformer and the power system line, in the case where a single generator-motor 12' being used, as shown in FIG. 1A. In this case, the required, current breaking capacity of the first breaker 14' can be reduced. In both arrangements, a second breaker 16 is further connected in series with the series connection of the main transformer and the first breaker.

Reference numeral 18 denotes a generator-motor, which will be called, as already described, an electric rotating machine or simply a rotating machine, distinguished from a generator-motor apparatus as a whole. A rotor of the electric rotating machine 18 is mechanically coupled to a pump-turbine (not shown) as a prime mover-load and rotates together therewith.

The rotating machine 18 has an armature winding 20 provided on a stator thereof and a field winding 22 provided on the rotor. In the example shown, therefore, the rotating machine 18 is of a so called rotating field type, however the application of the present invention is never limited to this type of rotating machine 18. A neutral point 24 of the armature winding 20 is grounded through a grounding resistor 26.

Between a junction 28 of both the breakers 14 and 16 and the field winding 22, there exists an excitation circuit, which is composed of a converter transformer 30 fed with AC voltage through a line 32 from the junction 28 and a frequency converter 34 for converting the frequency of the voltage supplied by the transformer 30 and exciting the field winding 22. In the embodiment shown, a cycloconverter is used as the frequency converter 34. In order to obtain an AC excitation voltage with an excellent waveform, there is used an excitation circuit, the detailed arrangement of which is shown in FIG. 2.

Incidentally, in the following description, the first breaker 14 is called a power system breaker, because it is provided on the side of the electric power system with respect to the junction 28, whereas the second breaker 16 is called a synchronizing breaker. Further, the junction 28 can also be regarded as a branching point of the excitation circuit from the main circuit. Moreover, there are cases in the following that, within the main circuit, a circuit on the side of the rotating machine 18 with respect to the junction 28 is especially referred to as an armature side circuit.

Figure 2:
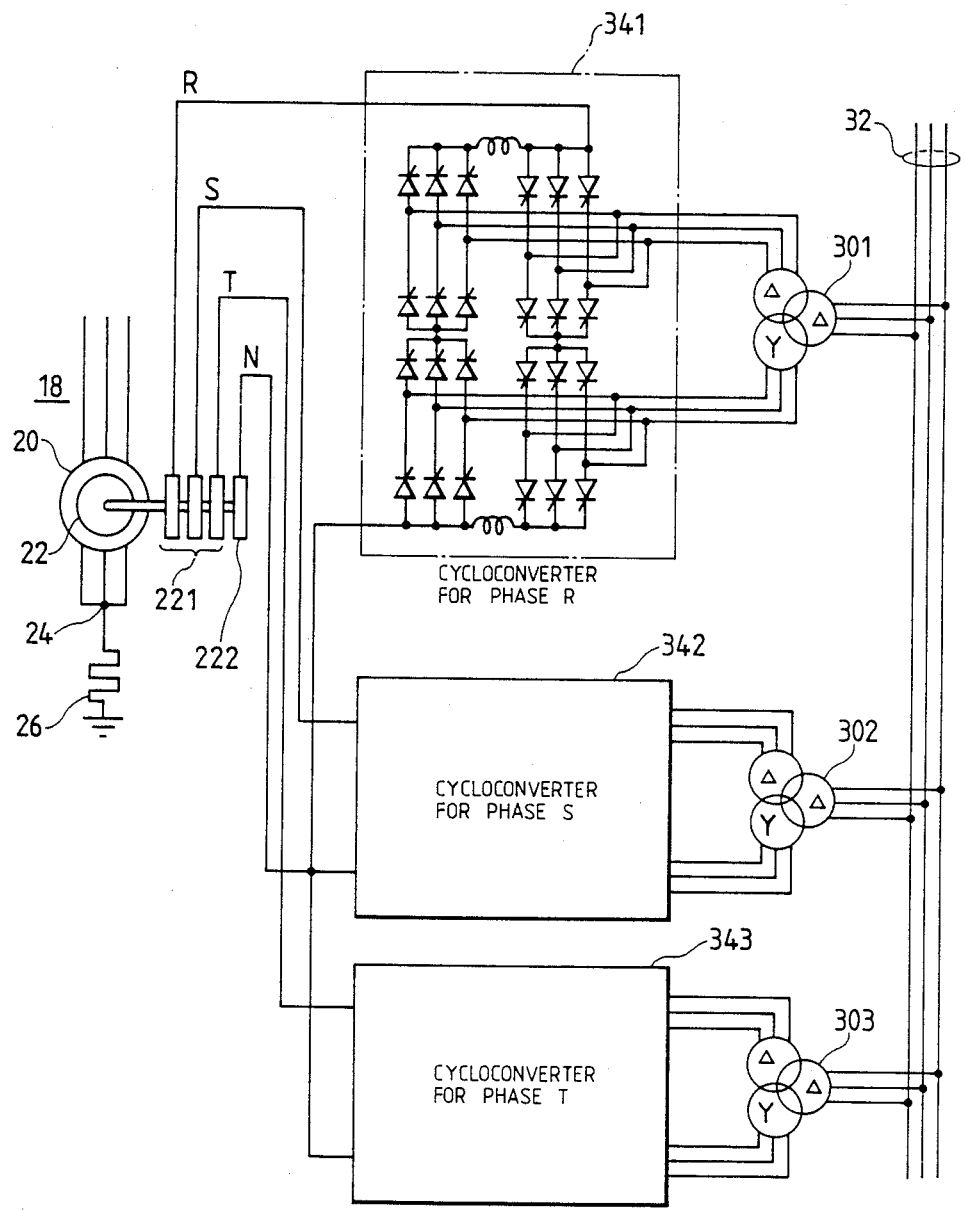
FIG. 2 shows a detailed circuit arrangement of an example of a frequency converter used in the generator-motor apparatus of FIG. 1.

In FIG. 2, the same reference numerals denote the same parts as in FIG. 1. Further, although the single reference numerals 30 and 34 have been given to the converter transformer and the cycloconverter in FIG. 1, respectively, they are actually composed of three transformers 301 to 303 for respective phases R, S, T of the three phase field winding 22 and three cycloconverters 341 to 343 connected to the corresponding transformers, as shown in FIG. 2.

Output voltages of the three cycloconverters 341 to 343 are supplied to respective windings of the field winding 22 through corresponding slip ring 221 provided on a rotor axle of the rotating machine 18. Further, reference numeral 222 denotes a slip ring, which is also provided on the rotor axle and through which a neutral point of the cycloconverter 34 is connected to that of the field winding 22.

In the case of FIG. 2, a twelve phase rectification system is adopted in order to suppress the occurrence of harmonics. Therefore, each of the transformers 301 to 303 has two secondary windings, one of which is formed in a delta connection and the other of which is formed in a star connection. Further, each of the three cycloconverters 341 to 343 is composed of a pair of unit converters. Further detailed construction of the cycloconverter 34 is not presented here because it is not essential to explaining the present invention.

Returning to FIG. 1, description will be made of a control circuit for the generator-motor apparatus. Reference numeral 40 denotes a phase detector, which determines a phase $\theta_s$ (an integrated value of frequency) as a reference signal for controlling excitation of the field winding 22 by the cycloconverter 34. The phase detector 40 comprises voltage transformer 42, voltage phase calculator 44 and slip phase calculator 46. The transformer 42 and the calculator 44 are provided for detecting a phase $\theta_v$ of the voltage of the power system.

The calculator 46 receives a rotating phase signal $\theta_r$ from an appropriate detector 48 such as a resolver synchro mechanically coupled to the rotor 22 of the rotating machine 18 as well as the phase signal $\theta_v$ obtained as above and calculates a slip phase $\theta_s$ on the basis of the difference of $\theta_v$ and $\theta_r$. The thus obtained slip phase $\theta_s$ is used as the aforesaid reference signal in the excitation control of the field winding 22 of the rotating machine 18.

Reference numeral 50 denotes an excitation controller, which receives the slip phase signal $\theta_s$ and produces a control instruction for adjusting an amplitude and a phase of AC current supplied for the field winding 22, which instruction rotates in synchronism with the slip phase signal $\theta_s$. The control instruction is coupled to automatic pulse phase shifter 52, in which a gate pulse signal for the cycloconverter 34 is produced in accordance with the control instruction supplied.

Further, the generator-motor apparatus includes a fault detection and protection system as described below. In FIG. 1, blocks 61 to 66 labeled by "OCR" or "RDfR" represent over current relays and ratio differential relays, respectively. The relays 61 to 66 are associated with particular current transformer or transformers 71 to 76, which are inserted in appropriate locations of the main and excitation circuits of the generator-motor apparatus. Details of the functions of the relays 61 to are as follows.

Incidentally, in the following description, every relay is referred to by a reference symbol labeled in a corresponding block and a current transformer by an abbreviation CT.

OCR 61: a relay for protection against an over current caused by a grounding or short-circuiting fault occurring on the armature side circuit, on the basis of an output signal of CT 71;

RDfR 62: a relay for protection against a fault occurring in a circuit inside an area covered by CTs 71 and 72, on the basis of output signals of those CTs (the detection of such a fault is called an interior fault detection);

OCR 63: a relay for protection against an over current caused by a fault, especially, between the neutral point 24 and the ground, on the basis of an output signal of CT 73;

RDfR 64: a relay for protection against an interior fault between CTs 71 and 73, especially in the vicinity of the neutral point 24, on the basis of output signals of CTs 71, 72 and 73;

OCR 65: a relay for protection against an over current caused by a fault occurring in the excitation circuit, on the basis of an output signal of CT 74; and RDfR 66: a relay for protection against an interior fault occurring in a circuit inside an area covered by CTs 74, 75 and 76, on the basis of output signals of those CTs.

In addition to the relays listed above, various relays for protection against a malfunction of the cycloconverter 34 may be further associated, however are omitted in this embodiment. If they are provided, output signals of those relays can be treated in the analogous manner to the output signals of the relays 61 to 66 as listed above.

Figure 3:
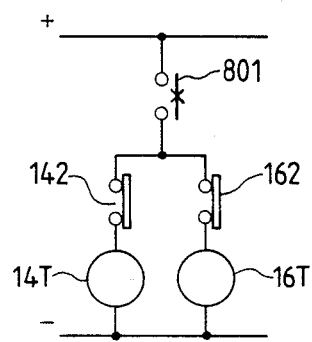
FIG. 3 is a drawing showing an example of a circuit for tripping a power system breaker and a synchronizing breaker used in the generator-motor apparatus of FIG. 1.

Referring at first to FIG. 3, description will be given on the simplest example of the protection operation for the generator-motor apparatus. In FIG. 3, reference symbols 14T and 16T denote trip coils of the power system breaker 14 and the synchronizing breaker 16, respectively, and reference numerals 142 and 162 denote auxiliary contacts (usually called pallet contacts) of the breakers 14 and 16, respectively, which are closed or opened together with closure and open of the corresponding breaker 14, 16. Reference numeral 801 is a normally open contact of a relay 80 (not shown).

The relay 80 is energized to close its contact 801, when at least one of the above listed relays 61 to 66 operates. Once the contact 801 is closed, the state thereof is maintained until it is manually tripped. In most cases, the relay 80 is not energized when only one of the relays 61 to 66 operates, but energized when more than two thereamong operate in combination. For example, it is energized when OCR 65 and RDfR 66 both detect a fault in the excitation circuit.

The operation of the circuit of FIG. 3 is as follows. When the electric rotating machine 18 is connected to the power system line 10 through the closed breakers 14, 16 and operates normally, the contact 801 is opened, while the pallet contacts 142, 162 are closed, as shown in the figure. Accordingly, the trip coils 14T, 16T are both under the deenergized state.

If any fault is detected by the relays 61 to 66 and accordingly the relay 80 (not shown) is energized, the contact 801 is closed and therefore the trip coils 14T and 16T are both energized. Upon energization of the trip coils 14T and 16T, the breakers 14 and 16 are opened almost simultaneously with each other, whereby a fault current is interrupted. Further, when the breakers 14, 16 are opened, their pallet contacts 142, 162 are also opened, whereby the current through the trip coils 14T, 16T is stopped after trip of the breakers 14, 16.

Compared with a current to be interrupted by an excitation breaker in the prior art, a current to be interrupted by the respective breakers 14, 16 in the embodiment shown is not as large, even in the case of a fault in the excitation circuit, where the prior art excitation breaker had to cut off the heaviest current. In this embodiment, the breaker 14 interrupts only a current flowing into a fault point within the excitation circuit from the power system, whereas the breaker 16 interrupts only a current flowing thereinto from the rotating machine 18.

In the foregoing, there has been described the protection operation, in which both breakers 14, 16 are opened almost simultaneously with each other, when a fault is detected. However, there is the case where it is preferred to prioritize the timing of the tripping of both breakers. For example, if a fault occurs in the armature side circuit, the synchronizing breaker 16 is at first opened and the power system breaker 14 is opened after a predetermined time delay, whereby the energy stored in the inductance of the field winding 22 during the normal operation can be regenerated to the power system.

Figure 4:
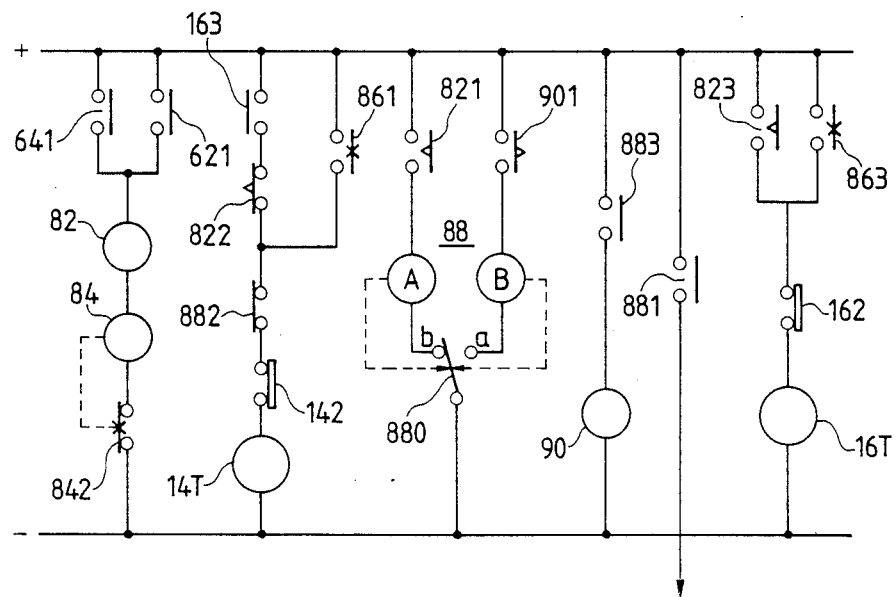
FIG. 4 is a drawing showing another example of a circuit for tripping both the breakers used in the generator-motor apparatus of FIG. 1.

The protection operation as mentioned above can be performed by a sequence circuit as described hereinafter. There is shown in FIG. 4 an example of such a sequence circuit. In the figure, the same reference numerals or symbols represent the same parts as in FIG. 3.

Further, in FIG. 4, reference numerals 82, 84, 88 and 90 denote auxiliary relays, among which the relay 88 has two relay coils A and B. Various contacts shown in the figure are as follows.

621, 641: normally open contacts of RDfRs 62 and 64, respectively;

821, 823: normally open contacts of the relay 82, which are closed instantaneously upon energization of the relay and opened with a predetermined time delay upon deenergization thereof;

822: a normally closed contact of the relay 82, which moves in synchronism with the contacts 821, 823, i.e., which is opened instantaneously upon energization of the relay and closed with the predetermined time delay upon deenergization thereof;

842: a normally closed contact of the relay 84, which is opened upon energization of the relay and maintains its state even upon deenergization thereof until it is manually closed;

861, 863: normally open contacts of the relay 86 (not shown) for the protection against a fault occurring in circuits other than an armature side circuit;

880: a transfer contact of the relay 88 with two fixed contacts a and b. When the coil A is energized, the contact 880 is closed on the side of the contact a, and when the coil B is energized, it is closed on the side of the contact b. Usually, the contact 880 is closed on the side of the contact b;

881, 883: contacts of the relay 88, which are opened when the contact 880 is closed on the side of the contact b and otherwise closed;

882: a contact of the relay 88, which is closed when the contact 880 is closed on the side of the contact b and otherwise opened;

901: a normally open contact of the relay 90, which is closed with a certain time delay upon energization of the relay and opened instantaneously upon deenergization thereof; and

163: an auxiliary contact of the breaker 16, which is opened and closed together with the closing and opening of the breaker 16.

Figure 5:
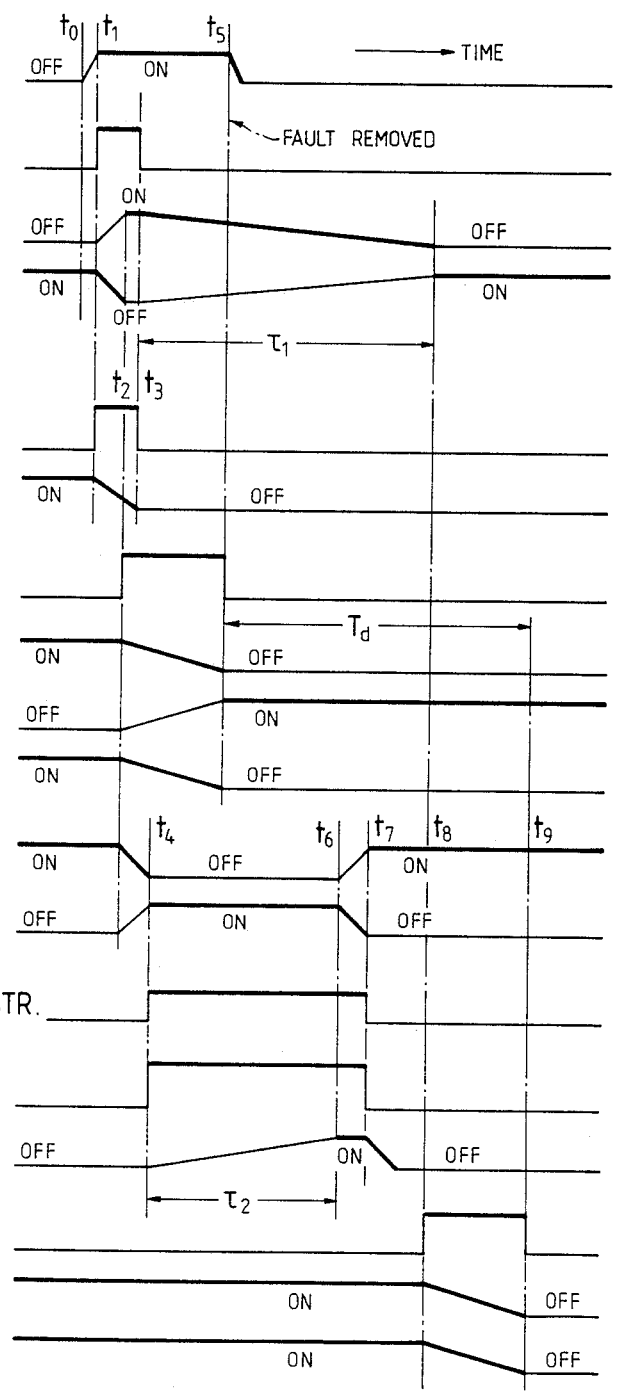
FIG. 5 is a diagram for explaining the sequence operation of the circuit of FIG. 4.

In the following, the operation of the circuit of FIG. 4 will be explained, referring to FIG. 5, in which there is illustrated the change in the states of the relays, contacts, coils and breakers in the circuit of FIG. 4. Further, in FIG. 5, a state of closure of the contacts and breakers is indicated as ON, and a state of open thereof as OFF. Moreover, numerals shown on the lefthand side in each drawing of FIG. 5 correspond to the reference numerals of the contacts in FIG. 4.

The state of each contact shown in FIG. 4 is a state in the case where the generator-motor apparatus continues to operate normally. Namely, when it operates normally, the power system breaker 14 and the synchronizing breaker 16 are both closed, so that their pallet contacts 142, 162 are closed, too, but the auxiliary contact 163 of the breaker 16 is opened.

Under such a normal operation state of the generator-motor apparatus, all of relays 82, 84, 88, 90 and the trip coils 14T, 16T are under the deenergized state, and contacts 822, 842, 882 are closed with the rest of the contacts being open. Further, the transfer contact 880 is closed on the side of the contact b. In respect of the foregoing, see the state before time point $t_0$ in FIG. 5.

First of all, let us assume that a fault occurs in the armature side circuit at time point $t_0$. The armature side circuit is, as already described, a circuit on the side of the rotating machine 18 with respect to the junction 28.

In the case as described above, either RDfR 62 or 64 must make the interior fault detection, so that either the contact 621 or 641 is closed (cf. FIG. 5(a)). In the example shown in FIG. 4, the contacts 621, 641 are connected in parallel with each other. The configuration of wiring of the contacts in this portion determines the condition of initiating the protection operation. For example, the contacts of OCRs 61, 63 can be added in series to the contacts 621, 641, respectively, if necessary. Variations or modifications of the combination of the contacts in this portion will be considered. In any case, the arrangement for the wiring of contacts in this portion must be determined in accordance with the necessity of the protection operation to be carried out.

When either the contact 621 or 641 is closed at time point $t_1$, the relays 82, 84 are energized (cf. FIGS. 5(b) and (e)). As a result, the contacts 821, 823 are closed quickly and the contact 822 is opened quickly, too, at time point $t_2$ (cf. FIGS. 5(c) and (d)). The contact 842 is opened at time point $t_3$ and maintained open thereafter (cf. FIG. 5(f)). Further, it is to be noted that the time scale is somewhat exaggerated in these figures.

By closure of the contact 823 at time point $t_2$, the energization of the trip coil 16T starts, because the pallet contact 162 is still closed (cf. FIGS. 5(g) and (j)). The synchronizing breaker 16 is tripped at time point $t_5$ (cf. FIG. 5(h)). Simultaneously therewith, the pallet contact 162 is opened and the contact 163 is closed (cf FIGS. 5(j) and (i)), whereby the energization of the trip coil 16T is stopped at time point $t_5$ (cf. FIG. (g)).

In this manner, by trip of the synchronizing breaker 16, the armature winding 20 of the rotating machine 18 is electrically separated from the power system and therefore a fault current never flows into a fault point within the armature side circuit from the power system, i.e., a fault is removed, whereby RDfRs 62, 64 are released and accordingly the contacts 621, 641 thereof are opened again (cf. FIG. 5(a)).

By the way, since the contact 821 is closed at time point $t_2$ (cf. FIG. 5(c)), the coil A of the relay 88 is energized and the transfer contact 880 is changed over to the contact a at time point $t_4$. At the same time, the contact 882 is opened and the contacts 881, 883 are closed (cf. FIGS. 5(k) and (l)). When contact 882 open, an energization circuit of the trip coil 14T is never established. That is to say, when a fault occurs in the armature side circuit, only the synchronizing breaker 16 is at first opened and the power system breaker 14 is for a while prevented from tripping.

Further, since the contact 881 is closed at time point $t_4$ (cf. FIG. 5(l)), a gate shift instruction is given to the excitation controller 50 (cf. FIG. 5(m)). The gate shift instruction is available for modifying the control instruction generated in the controller 50 such that the gate pulse signal generated in the phase shifter 52 based on the modified control instruction makes the cycloconverter 34 operate as an inverter. As a result, the cycloconverter 34 functioning as an inverter can regenerate the energy stored in the inductance of the field winding 22 during the normal operation of the rotating machine 18 to the power system through the still closed power system breaker 14.

Also the relay 90 is energized by closure of the contact 883 from time point $t_4$ (cf. FIG. 5(n)), and the contact 901 is closed after a predetermined time delay $\tau_2$ at time point $t_6$ (cf. FIG. 5(o)). Therefore, the coil B of the relay 88 is energized, whereby the transfer contact 880 is changed over from the contact a to the contact b at time point t₇. At the same time, the contact 882 is closed and the contacts 881, 883 are opened (cf. FIGS. 5(k) and (l)).

Although the contact 882 is closed, the trip coil 14T is not yet energized, since the contact 822 is of the time delay reset type and is still opened (cf. FIG. 5(d)). Further, by opening contacts 881 and 883, the gate shift instruction disappears and the relay 90 is released, at time point t₇ (cf. FIGS. 5(m) and (n)). A time duration, in which the cycloconverter 34 is operated as an inverter, is almost determined by the time constant $\tau_2$ of the contact 901 of the time delay operating type.

When time point t₈ is reached, the time delay reset contact 822 is closed again (cf. FIG. 5(d)). Although the contacts 821, 823 of the same kind are opened, too (cf. FIG. 5(c)), there occurs no influence thereby. When the contact 822 is closed, the trip coil 14T is energized (cf. FIG. 5(p)), because the contacts 163, 882 and the pallet contact 142 included in an energization circuit of the trip coil 14T are all closed (cf. FIGS. 5(i), (k) and (r)).

As a result, the power system breaker 14 is tripped at time point t₉ (cf. FIG. 5(q)). Simultaneously therewith, the pallet contact 142 is opened and thereafter the energization of the trip coil 14 is stopped (cf. FIGS. 5(r) and (p)). By the trip of the power system breaker 14, the excitation circuit of the rotating machine 18 is separated from the power system.

As will be understood from the foregoing description, a time interval or delay $T_d$ between the trip of the synchronizing breaker 16 and that of the power system breaker 14 is substantially adjusted by a time constant $\tau_1$ of the time delay reset contact 822.

Next, an explanation will be given of the protection provided against a fault occurring in circuits other than the armature side circuit, i.e., in the excitation circuit of the rotating machine 18 or in a circuit on the side of the power system with respect to the junction 28.

In this case, OCR 65 operates and/or RDfR 66 makes the interior fault detection. The relay 86 (not shown) operates in response to the operation of those relays 65, 66. As a result, the contacts 861, 863 are closed and therefore the trip coils 14T, 16T are energized almost simultaneously. Therefore, against the fault in this case, the synchronizing breaker 16 and the power system breaker 14 are opened almost simultaneously with each other in the same manner as the case in FIG. 3.

As described above, in accordance with the present invention, a series connection including a power system breaker and a main transformer is coupled in series with a synchronizing breaker between a power system and a generator-motor, and an excitation circuit for the generator-motor is provided between a field winding of the generator-motor and a junction of the series connection and the synchronizing breaker, whereby both the breakers cut off a fault current flowing from the power side and a fault current flowing from the generator-motor side separately.

With the aforesaid disposition of a power system breaker and a synchronizing breaker that is used in place of an excitation breaker in the prior art, it is not necessary to have as large a current breaking capacity as in the prior art excitation breaker. Accordingly, there can be realized a generator-motor apparatus with more economical protection measures.

We claim:
1. A generator-motor apparatus, comprising:
   a generator-motor with an armature winding and a field winding, a rotor of which is mechanically coupled with a prime mover-load;
   a main transformer provided between one of the windings of said generator-motor and an electric power system;
   a synchronizing breaker for connecting the one winding of said generator-motor with the electric power system through said main transformer;
   an excitation circuit including a frequency converter for exciting the other winding of said generator-motor and a converter transformer connected to the frequency converter;
   a power system breaker connected in series with said main transformer and connected between the electric power system and said synchronizing breaker; and
   said excitation circuit being branched from a junction between said synchronizing breaker and a series connection of said main transformer and said power system breaker.

2. A generator-motor apparatus as defined in claim 1, wherein:
   said power system breaker is connected to said main transformer on the side of said generator-motor with respect to said main transformer.

3. A generator-motor apparatus as defined in claim 1, wherein:
   said power system breaker is connected to said main transformer on the side of the electric power system with respect to said main transformer.

4. A generator-motor apparatus as defined in claim 1, wherein:
   said power system breaker and synchronizing breaker are tripped substantially at the same time.

5. A generator-motor apparatus as defined in claim 1, further comprising means for detecting a fault occurring on the side of said generator-motor with respect to a branching junction of said excitation circuit, and means responsive to the detection of a fault by said fault detecting means for tripping said synchronizing breaker almost instantaneously and for tripping said power system breaker after a predetermined time delay.

6. A generator-motor apparatus as defined in claim 1, further comprising means for detecting a fault occurring in said excitation circuit and in a circuit on the side of the electric power system with respect to said branching junction of said excitation circuit and said power system breaker, and said means responsive to the detection of a fault by said fault detecting means for tripping said power system breaker and said synchronizing breaker at substantially the same time.

* * * * *